(12) United States Patent
Ebert et al.

(10) Patent No.: US 12,331,938 B2
(45) Date of Patent: Jun. 17, 2025

(54) ESTABLISHING A DEGREE OF BROWNING OF FOOD TO BE COOKED

(71) Applicant: BSH Hausgeräte GmbH, Munich (DE)

(72) Inventors: Sandra Ebert, Stuttgart-Feuerbach (DE); Roland Schleser, Stuttgart-Feuerbach (DE)

(73) Assignee: BSH Hausgeräte GmbH, Munich (DE)

( * ) Notice: Subject to any disclaimer, the term of this patent is extended or adjusted under 35 U.S.C. 154(b) by 1176 days.

(21) Appl. No.: 16/320,560

(22) PCT Filed: Aug. 1, 2017

(86) PCT No.: PCT/EP2017/069450
§ 371 (c)(1),
(2) Date: Jan. 25, 2019

(87) PCT Pub. No.: WO2018/033383
PCT Pub. Date: Feb. 22, 2018

(65) Prior Publication Data
US 2019/0242584 A1    Aug. 8, 2019

(30) Foreign Application Priority Data
Aug. 18, 2016    (DE) .................... 10 2016 215 550.4

(51) Int. Cl.
*F24C 7/08*     (2006.01)
*A23L 5/10*     (2016.01)
*A47J 37/08*    (2006.01)

(52) U.S. Cl.
CPC ............... *F24C 7/085* (2013.01); *A23L 5/10* (2016.08); *F24C 7/08* (2013.01); *A23V 2002/00* (2013.01); *A47J 37/085* (2013.01)

(58) Field of Classification Search
CPC ...... F24C 7/08–088; A23L 5/10; A47J 37/085
(Continued)

(56) References Cited

U.S. PATENT DOCUMENTS 3,905,045 A * 9/1975 Nickel .................... A61B 6/02
382/294
8,687,842 B2 * 4/2014 Yoon ...................... F24C 7/085
382/100

(Continued)

FOREIGN PATENT DOCUMENTS

CN     203104843 U  * 7/2013
DE     102005014713 A1   10/2006
(Continued)

*Primary Examiner* — Drew E Becker
*Assistant Examiner* — Austin Parker Taylor
(74) *Attorney, Agent, or Firm* — Michael E. Tscupp; Andre Pallapies; Brandon G. Braun

(57) ABSTRACT

In a method for establishing a degree of browning of food to be cooked in a cooking chamber of a household cooking appliance, a reference image is captured by a camera of the household cooking appliance, which camera is directed into the cooking chamber. A first measurement image is captured at a first brightness of a light source of the household cooking appliance, and a second measurement image is captured at a second brightness of the light source. A difference image is generated from the first measurement image and the second measurement image, and the difference image is compared with the reference image.

14 Claims, 3 Drawing Sheets

(58) Field of Classification Search
USPC .......................................................... 426/248
See application file for complete search history.

(56) References Cited

U.S. PATENT DOCUMENTS

| | | | | |
|---|---|---|---|---|
| 2004/0206248 | A1* | 10/2004 | Lawson | A47J 37/085 99/388 |
| 2010/0182136 | A1* | 7/2010 | Pryor | G01F 23/292 340/425.5 |
| 2011/0002677 | A1* | 1/2011 | Cochran | A47J 37/0623 392/416 |
| 2012/0076350 | A1 | 3/2012 | Yoon et al. | |
| 2013/0302483 | A1* | 11/2013 | Riefenstein | G06T 7/001 426/233 |
| 2014/0079291 | A1* | 3/2014 | Johnson | G06T 7/0008 382/110 |
| 2014/0084811 | A1* | 3/2014 | Bender | H05B 45/50 315/297 |
| 2014/0090098 | A1* | 3/2014 | Feikert | A01N 57/16 435/320.1 |
| 2014/0361706 | A1* | 12/2014 | Kulkarni | H03K 17/00 315/291 |
| 2015/0257597 | A1* | 9/2015 | Marschke | A47J 37/0807 29/890.03 |
| 2015/0302569 | A1* | 10/2015 | Armstrong | F24C 7/083 382/190 |
| 2015/0330640 | A1* | 11/2015 | Stork genannt Wersborg | G01N 33/02 99/332 |
| 2016/0192446 | A1* | 6/2016 | Seddik | H05B 6/6464 219/705 |

FOREIGN PATENT DOCUMENTS

| | | | | |
|---|---|---|---|---|
| DE | 102007048834 A1 * | 4/2008 | | F24C 7/087 |
| DE | 102008042804 A1 * | 4/2009 | | F24C 7/085 |
| EP | 0682243 A1 | 11/1995 | | |
| EP | 1504665 A1 | 2/2005 | | |
| EP | 1504666 A1 | 2/2005 | | |

* cited by examiner

ESTABLISHING A DEGREE OF BROWNING OF FOOD TO BE COOKED

CROSS-REFERENCES TO RELATED APPLICATIONS

This application is the U.S. National Stage of International Application No. PCT/EP2017/069450, filed Aug. 1, 2017, which designated the United States and has been published as International Publication No. WO 2018/033383 A1 and which claims the priority of German Patent Application, Serial No. 10 2016 215 550.4, filed Aug. 18, 2016, pursuant to 35 U.S.C. 119(a)-(d).

BACKGROUND OF THE INVENTION

The invention relates to a method for establishing a degree of browning of food to be cooked in a cooking chamber of a household cooking appliance. The invention further relates to a household cooking appliance which is configured for carrying out the method. The invention is able to be advantageously applied, in particular, to ovens.

EP 0 682 243 A1 discloses a cooking appliance having a browning sensor device. The cooking appliance has a control unit via which the appliance may be switched off as soon as the degree of browning predetermined by the measuring sensor is reached for a specific food to be cooked. The cooking appliance further comprises a storage device in which measurement results may be stored. In particular, a device and a method for measuring the degree of browning of a food to be cooked, in particular a baked food, are specified, having at least one radiation source which produces a measuring beam and a reference beam of different wavelength ranges, the reflection and back-scattering thereof being influenced differently by the degree of browning of the food to be cooked and being both irradiated via an optical system onto the food to be cooked, having a measuring sensor for detecting the radiation emitted by the food to be cooked, having a reference sensor for detecting the intensities of the measuring beam and the reference beam, and having an apparatus for determining the degree of browning from the intensity of the measuring beam detected by the measuring sensor, from the intensity of the reference beam detected by the measuring sensor, from the intensity of the measuring beam detected by the reference sensor and from the intensity of the reference beam detected by the reference sensor.

EP 1 504 666 A1 discloses a cooking appliance comprising a browning sensor device, an electronics unit and a storage unit. In order to provide such a cooking appliance with greater operating comfort and greater flexibility in the use of the browning sensor device, it is proposed that at least one dataset with a predetermined degree of browning of a food to be cooked is able to be obtained by means of an input unit and the electronics unit via at least two classification levels.

DE 10 2005 014 713 A1 discloses a sensor device having a data processing unit for determining a degree of browning of a food to be cooked which is arranged in a cooking chamber and having at least one sensor for detecting a radiation intensity reflected by the food to be cooked. In order to provide a sensor device for cooking appliances by means of which a degree of browning of a food to be cooked may be determined safely, reliably and in particular irrespective of a size and shape of the food to be cooked, it is proposed that the data processing unit is provided for determining a relevance parameter for a characteristic variable of the detected radiation intensity as a function of the temporal progression of the detected radiation intensity.

EP 1 504 665 A1 discloses a browning sensor device for determining a degree of browning of food to be cooked, said browning sensor device having a transmitting unit and a receiving unit and a coupling unit forming an interface with a cooking chamber. To this end it is proposed that the coupling unit comprises at least two coupling means.

When visually identifying browning it is a drawback that evidence of when a desired degree of browning is reached may be obtained only with difficulty. Thus a food to be cooked may be regarded as already burnt by a user if only a small partial surface is already carbonized. Observing the food to be cooked by means of localized high-resolution cameras with high color depth, however, is complex and costly. This is complicated further by the browning process being a highly non-linear process, in which dark portions of the surface already absorb the heat radiation more effectively than light areas. Therefore, a chronologically continuous and accurate observation of the food to be cooked is required in order to achieve in a reliable manner a desired degree of browning and, in particular, a timely switching-off of a heating process.

BRIEF SUMMARY OF THE INVENTION

It is the object of the present invention to overcome at least partially the drawbacks of the prior art and, in particular, to provide a possibility for identifying the browning of food to be cooked with a greater level of accuracy, which may be implemented by means of a relatively simple camera.

This object is achieved according to the features of the independent claims. Preferred embodiments are able to be derived, in particular, from the dependent claims.

The object is achieved by a method for establishing a degree of browning of food to be cooked in a cooking chamber of a household cooking appliance. To this end, the household cooking appliance has a camera directed into the cooking chamber and a light source for illuminating the cooking chamber. In the method, an image ("reference image") is captured by means of the camera, a further image ("first measurement image") is captured at a first brightness of the light source, a further image ("second measurement image") is captured at a second brightness of the light source, a difference image is generated from the first measurement image and the second measurement image and the difference image is compared with the reference image.

This method provides the advantage that it permits a spatially resolved determination of a temporal progression of the browning of a food to be cooked, and namely irrespective of the scattered light which may be present and which, for example, may pass through a viewing window of a cooking chamber door into the cooking chamber. This elimination of a source of errors in the spatially resolved determination of the color and/or the brightness of the food to be cooked, significantly facilitates a timely identification of a degree of browning. Additionally, by calculating the difference, low resolution and thus particularly inexpensive cameras may also be used. Moreover, white balancing may be dispensed with.

This difference image may also be denoted as the "measurement difference image".

Instead of or analogously to the brightness, a further suitable radiation parameter such as a light beam or a light intensity may also be used.

The household cooking appliance may have an oven, wherein the cooking chamber may also be denoted as an oven chamber. The household cooking appliance may have a microwave function and/or a steam treatment function. The household cooking appliance may also be a microwave appliance and/or a steam cooker.

The cooking chamber, in particular, has a feed opening which is able to be closed by means of a cooking chamber door. The cooking chamber door may have a viewing window for looking into the cooking chamber.

The food to be cooked may also be denoted as food or foodstuffs.

The camera has an image sensor, for example a CCD sensor or a CMOS sensor. The camera may be provided with or coupled to an image processing unit which generates an image from the measurement signals of the image sensor. The camera may also simply have the image sensor and/or be an image sensor. The camera may be a color camera (i.e. it is able to capture color images) or may be a black-and-white camera (i.e. it is able to capture gray-scale images).

The camera may also have a lens arranged optically upstream of the image sensor. The camera is, in particular, a digital camera. The camera may have a storage device for storing the images captured thereby or may be connected to such a storage device. The storage device may constitute part of the household appliance or may be connected by data technology to the household appliance, for example an online storage device.

The camera may be arranged on a top wall or a side wall of the cooking chamber. The household appliance may have just one camera which is particularly inexpensive. The household appliance may, however, also have a plurality of cameras, whereby the cooking chamber may be monitored in a particularly comprehensive manner, for example for a plurality of feed planes. The method may thus be carried out for each of the cameras.

A development is that the reference image is captured before the first measurement image and the second measurement image are captured. By capturing the two measurement images at differently adjusted brightness of the light source and a subsequent calculation of the difference, the influence of stray light and/or scattered light, which is not introduced by the light source into the cooking chamber, may be considered and, in particular, also compensated.

A development is that the capturing of the first measurement image, the capturing of the second measurement image, the generation of the (measurement) difference image and the comparison of the (measurement) different image with the reference image is carried out repeatedly for different first and second measurement images and/or (measurement) difference images and the same reference image. Thus chronologically successive comparisons may be carried out for determining the browning using the same reference. In other words, the second to fifth steps may be carried out repeatedly for the same reference image.

A development is that the comparison of the difference image with the reference image comprises combining the two image contents. The combining of the two image contents may comprise the application of a mathematical function. A development is that the comparison comprises a comparison of the same image areas (including optionally the entire image). A development is that the comparison comprises a pixel-type comparison and/or a comparison of the same pixels. By means of the comparison, a browning and/or a progressive browning may be determined using an initial state of the food to be cooked contained in the reference image and thus may be particularly accurately determined.

The method may be carried out by considering color information. This has the advantage that a browning of the food to be cooked may also be identified in which a color change is produced during browning whilst the brightness is at least approximately maintained. This may be the case, for example, if initially dark green food to be cooked turns a brown color.

A development is that for generating the difference image from the first and the second measurement image the values of the respective color channels (for example red, green and blue) of the same pixels may be subtracted from one another. The comparison of this colored difference image with the reference image may be carried out in turn by taking into account color information, for example separately for each color channel, for example pixel-by-pixel. Thus it is possible to detect a minimum interval of a pixel in a color space (for example in a three-dimensional RGB space) from a predetermined color location (for example an RGB triple value) or even from a predetermined area in the color space which, for example, comprises the colors dark brown to black and to use this interval for the comparison.

Alternatively, the comparison may be carried out without taking into account color information, for example by the color information being converted into brightness information/a gray-scale value for the comparison.

The method may, however, also be carried out by taking into account only one piece of information relative to the brightness or gray-scale images, which makes the comparison particularly simple. Thus if the relevant images are gray-scale images, a calculation of the difference may comprise a simple pixel-by-pixel subtraction of the gray-scale values. In addition, the comparison may be limited to a comparison of gray-scale values.

A development is that the reference image is captured at the start of a cooking process. This permits a particularly accurate determination of an initial state of the food to be cooked or at the start of its browning.

The method may be carried out entirely by means of the household appliance, which provides the advantage that the household appliance may establish automatically the browning and, for example, is not dependent on a data connection with an external component. The method, however, may also be carried out by means of a shared system which comprises the household appliance and at least one further component connected to the household appliance by data technology (for example via a wireless and/or wired data connection). The other component may be configured by hardware and/or software technology. The other component may, for example, be a server of a household appliance manufacturer. The shared system has the advantage that the data processing capacity of the household appliance may be kept small which in turn keeps the costs for such a household appliance particularly low. For example, the image processing including the calculation of a difference and the comparison may be carried out externally, for example on a computer of the household appliance manufacturer, in a cloud, etc.

One embodiment is that the comparison comprises a determination of whether a result of the comparison fulfills a predetermined criterion. This criterion may correspond to reaching a desired degree of browning. The comparison may also comprise determining a plurality of criteria, which for example correspond to different degrees of browning, for example a minimum degree of browning and a maximum degree of browning. A development is that the different criteria have to be fulfilled by being combined in order to trigger an action (see also further below). This step of determination may also be regarded as a step which is subsequent to the comparison.

A further embodiment is that for the comparison of the (measurement) difference image with the reference image, the reference image is taken or subtracted from the difference image, in particular pixel-by-pixel. In other words, a further difference image which may also be denoted as the "browning image" is produced from the (measurement) difference image and the reference image. This further difference image may thus be used in order to determine whether a predetermined criterion is fulfilled. This "dual differentiating" embodiment permits a particularly simple determination of whether a degree of browning has been reached, by using inexpensive means. This embodiment is also able to be implemented in a particularly simple manner when the relevant images are gray-scale images. The calculation of a difference may thus comprise a pixel-by-pixel subtraction of the gray-scale values.

A further embodiment is also that the reference image itself is a "stray light normalized" difference image which simplifies a comparison with the difference image generated from the measurement images. The reference image may be generated in a similar manner to the difference image generated from the measurement images, for example from a first image captured at the first brightness and a second image captured at the second brightness, in particular at the start of the cooking process. This stray light normalized difference image may also be denoted as the "reference difference image". The "dual differentiated" browning image may thus be provided in one embodiment as a difference between a measurement difference image and a reference difference image.

Alternatively the reference image is a simple non-differentiated image.

A further embodiment is that the first brightness is zero and the second brightness corresponds to a brightness when the light source is switched on. As a result, the influence of the stray light may be considered and excluded in a particularly simple manner. The first measurement image is thus captured when the light source is switched off (wherein the cooking chamber is only illuminated by externally incident stray light) and the second measurement image when the light source is switched on. An image captured at a brightness of zero (no artificial light, only stray light) may also be denoted as a dark image. An image captured when the light source is switched on (artificial light and stray light) may also be denoted as a bright image.

A development is that a brightness of the light source of zero corresponds to a switched-off light source. A further development is that the light source is able to be switched between two states, namely a switched-off state and a switched-on state. The first brightness may be a brightness which is able to be set to a maximum level.

A development is that the light source is operated with the brightness modulated. This may comprise a regular, in particular periodic, operation of the light source between two brightness values or brightness levels, in particular a regular switching on and off of the light source. This development provides the advantage that the camera may capture the images—in particular measurement images—within the respective time periods. The brightness modulation may, for example, be achieved by applying a corresponding voltage to the light source. The brightness modulation may also be understood as a modulation of the light flux emitted by the light source.

A development is that the household cooking appliance has a control device which controls the camera and the light source, in particular an exposure of the camera synchronized with a brightness of the light source. If the household cooking appliance has a plurality of light sources, the control device may synchronize these light sources for simultaneous operation.

A further embodiment is that the light source is operated by pulse-width modulation. This permits a particularly simple activation and a particularly sharp chronological transition between the on-phase and off-phase. The control device may synchronize an illumination phase of the camera with an on-phase or an off-phase of the light source for generating a bright image and/or dark image.

A further embodiment is also that the light source is operated at an eye inertia frequency. As a result, it is possible to prevent an observer of the cooking chamber from perceiving the brightness fluctuations of the brightness modulated light source. By "eye inertia frequency" is understood a frequency in which the inertia of the human eye is no longer able to chronologically distinguish and thus chronologically integrate these brightness fluctuations. A development is that the light source is brightness-modulated at a frequency of at least 25 Hz. In order to avoid perceptible brightness fluctuations in a particularly reliable manner, it is particularly advantageous if the light source is brightness-modulated at a frequency of at least 50 Hz.

A further embodiment is that the first measurement image is captured during at least one off-phase of the pulse-width modulation and the second measurement image is captured during at least one on-phase of the pulse-width modulation. Thus the first measurement image and the second measurement image may be captured without altering the brightness modulation. The first measurement image may be captured during just one off-phase or during a plurality of off-phases. The second measurement image may be captured during just one on-phase or during a plurality of on-phases. The image-capturing during a plurality of phases increases the illumination time and may reduce image noise.

A further embodiment is that the light source has or is an LED. The light source may have or be just one LED or a plurality of LEDs. The use of LEDs has the advantage that they may be brightness-modulated at high frequencies, in particular pulse-width modulated. Additionally, their brightness may be very accurately set by applying a corresponding voltage which is particularly advantageous for determining the degree of browning. Moreover, LEDs have a particularly long service life and take up little constructional space. The control device may have a driver for operating the LED(s).

A development is that the entire difference image which has been captured is compared with the entire reference image which has been captured. This provides the advantage that, in particular, many foods may be monitored at the same time and/or that all foods in the field of view of the camera may be monitored in a reliable manner.

A further embodiment is that the difference image is compared in some areas with the reference image. In this case, therefore, the entire image is not considered but only a portion thereof. This provides the advantage that the degree of browning is able to be determined more accurately. A development is that the difference image is compared with the reference image in an area which comprises or shows at least one food. In this case, therefore, image areas which show no foods are not considered or are "masked" and as a result also make no meaningful contribution to determining the degree of browning. The considered area may be a continuous area or a plurality of discontinuous partial areas. The plurality of discontinuous partial areas may reveal different foods (for example a plurality of muffins, cookies, or the like).

A development is that a plurality of partial areas may be monitored and/or subjected to the method independently of one another. This provides the advantage that different foods with different browning behavior may be monitored individually for reaching a predetermined degree of browning. In this development partial areas may also overlap one another.

A development is that an image area or image detail selected for the comparison has been predetermined by a user and/or only areas of the difference image are compared with the reference image which have been previously predetermined by a user. Thus a selection of an image area may be provided which is particularly accurate and exactly matched to a user's wishes. A development is that the household cooking appliance has a screen on which images captured by the camera from the cooking chamber may be shown. The household cooking appliance, in particular the screen thereof, may also be designed to permit the user to place an image frame (also denoted as a "bounding box") around the desired image area and thus specify the considered image area. A plurality of image frames may also be specified. These may be discontinuous or may overlap. Alternatively or additionally, a user may input the image areas from a mobile device or a computer ("remotely").

An additional or alternative development is that the image area is automatically selected, for example by the household cooking appliance or by means of an external evaluation apparatus coupled to the household cooking appliance. A development is that the household cooking appliance is designed to carry out image recognition of foods or food to be cooked, illustrated in the image and only to consider image areas which have foods or which correspond.

A further embodiment is that only areas of the difference image which are free of a predetermined pattern are compared with the reference image. This permits a particularly accurate defining of the image areas of the food to be cooked to be considered for comparison. In this case, use is made of the fact that food to be cooked generally has no regular pattern on its surface. As a result—in particular by means of the household cooking appliance—a predetermined pattern and/or an image area having the pattern may be identified in a captured image and remain unconsidered for the comparison. This pattern identification may be carried out, for example, in a control device of the household cooking appliance which has a corresponding image evaluation function. The pattern may be a regular pattern, for example a matrix pattern, a linear pattern, an annular pattern, etc. In principle, a single pattern may be predetermined or a plurality of patterns may be predetermined for pattern identification.

A development is that a supporting area of a carrier for food to be cooked (for example a baking sheet or the like) is provided with such a pattern. Where food to be cooked is positioned, the pattern is not visible. An alternative or additional development is that baking paper is provided with such a pattern.

A further embodiment is that only areas of the difference image which have become significantly darker as the cooking process progresses are compared with the reference image. This permits a particularly accurate and simple determination of an image area. This embodiment may be used additionally or alternatively to other methods for determining an image area. In this case, use is made of the fact that in practice only browning food to be cooked becomes darker as the cooking process progresses.

A development is that for determining which image areas have become significantly darker, two chronologically spaced apart images are captured by means of the camera and the brightness differences thereof are compared by being spatially resolved (for example pixel-by-pixel). The chronological interval between the captured images may be predetermined. The chronological interval between the captured images may be predetermined in a variable manner, for example according to a set cooking chamber temperature, a type of food to be cooked, etc. In particular, the measurement images or the difference images may be used as the images.

A further embodiment is also that the reference image is captured again with a chronological offset. This provides the advantage that—in particular physical—alterations to the food to be cooked during the cooking process may be considered. Such alterations may comprise a rising of the food to be cooked (for example of leavened dough) etc. In this embodiment, the newly captured reference image may replace the previously used reference image so that the method is carried out from then on with the latest captured reference image. The chronological interval or offset of the captured reference images may be fixedly predetermined. The chronological interval may alternatively be predetermined in a variable manner, for example depending on a set cooking chamber temperature, a type of food to be cooked, etc.

An alternative or additional development is that a new reference image is captured depending on an occurrence of an event. For example, a reference image may be captured again after each opening and closing of the cooking chamber door in order to be able to consider possible displacements of the food to be cooked (on the baking sheet or by displacing the baking sheet), a removal or addition of food to be cooked, etc.

A further embodiment is also that based on the comparison at least one action is triggered by the household cooking appliance, and namely in particular depending on whether the result of the comparison is that a predetermined criterion is fulfilled or not. The action may, for example, comprise switching off a heat source or a heating of the cooking chamber and/or a notification of a user. The notification of a user may comprise an acoustic notification (for example by activating a buzzer) and/or a visual notification (for example by activating a flashing light) and/or notification by transmitting a message to an external device (for example a mobile phone, a smartwatch, etc). For transmitting the message to the external device the household cooking appliance may be provided with a wireless communication interface (for example a Bluetooth module or a WLAN module) and/or a wired communication interface (for example with an Ethernet connection). The transmitted message may comprise or contain a captured image of the cooking chamber. In a development, the user may remotely control, for example discontinue or lengthen, the cooking process. For example, the user may have been informed thereof by the image transmitted to him of the cooking chamber.

A further embodiment is that the result of the comparison comprises reaching a predetermined proportion of pixels with a minimum coloration. This permits a particularly reliable establishing of browning, even over a large surface area. When considering color information "minimum coloration" may be understood as a minimum value of an alteration of a color value (locally in the color space) toward brown or black.

If the comparison is carried out using gray-scale images, the minimum coloration may be understood as a minimum value of a difference of a brightness of a pixel of the difference image in comparison with a brightness of the same pixel of the difference image. If, for example, the brightness of this pixel does not alter between the difference image and the reference image, the brightness difference is zero. If, however, the pixel of the difference image is darker due to browning, an (absolute) brightness difference greater than zero is present. The greater the browning, the greater the brightness difference.

The proportion of pixels with the minimum coloration may—in particular with gray-scale images—for example be plotted as a histogram of the brightness difference of the respective pixel determined by the comparison. If a number or a proportion of the pixels which are above a predetermined first threshold value of the (absolute) brightness difference is the same or greater than a second threshold value, a desired browning is reached and the action may be triggered. The first threshold value may also be used in order to establish exceeding a maximum browning and to switch off the heating before a noticeably burnt area is formed on the food to be cooked.

The proportion of pixels with a minimum coloration, corresponding to the proportion of the surface of the food to be cooked, may be predetermined by the household cooking appliance (optionally depending on a cooking chamber temperature and/or a type of food to be cooked, etc.) and/or set by a user. For example, the first threshold value may be raised for a greater degree of browning and the second threshold value may be raised for browning over a larger surface area.

A further embodiment is that a reduction in the brightness of the light source due to ageing is compensated. This may be carried out in principle in the known manner by the household cooking appliance (for example the control device thereof) or the light source itself. For example, for compensating for a reduction in the light output of an LED due to ageing the operating current thereof may be increased.

The object is also achieved by a household cooking appliance which is designed for carrying out the method as described above. The household cooking appliance may be configured in a similar manner to the method and has the same advantages.

For example, an embodiment is that the household cooking appliance has a cooking chamber, a camera directed into the cooking chamber and a light source for illuminating the cooking chamber. The household cooking appliance may be able to carry out the method—for example by a corresponding embodiment of a control device in terms of hardware and/or software technology, i.e. in particular capture a reference image by means of the camera, capture a first measurement image at a first brightness of the light source, capture a second measurement image at a second brightness of the light source, generate a difference image from the first measurement image and the second measurement image and compare the difference image with the reference image.

The household cooking appliance may have a separate evaluation apparatus (optionally including an image processing function) which is coupled or connected to the control device. The household cooking appliance may, however, also have a control device into which the functions of an evaluation apparatus are integrated. The evaluation apparatus, however, may be arranged or relocated at least partially outside the cooking appliance; it is then coupled to the household cooking appliance by means of data technology.

BRIEF DESCRIPTION OF THE DRAWINGS

The above-described properties, features and advantages of this invention and the manner in which they are achieved become clearer and more clearly comprehensible in combination with the following schematic description of an exemplary embodiment, which is described in more detail in combination with the drawings.

DETAILED DESCRIPTION OF EXEMPLARY EMBODIMENTS OF THE PRESENT INVENTION

Figure 1:
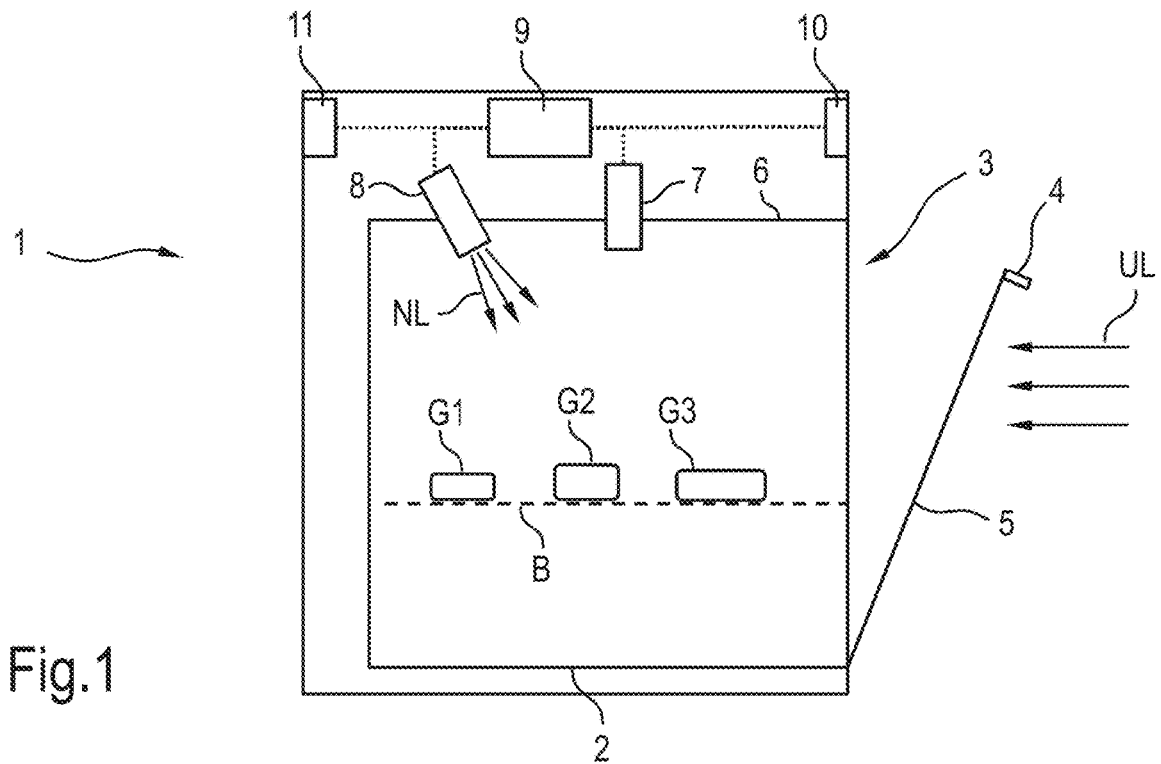
FIG. 1 shows a sectional representation of a side view of a household cooking appliance with a cooking chamber, a camera and a light source.

FIG. 1 shows a sectional representation of a side view of a household cooking appliance 1 with a heatable cooking chamber 2. The cooking chamber 2 may be an oven chamber and the household cooking appliance 1 may be an oven or a cooker.

The cooking chamber 2 has on the front side a feed opening 3 which is able to be closed by means of a door 4. The door 4 has a viewing window 5 through which a user obtains a view into the cooking chamber 2 and through which ambient light UL may be incident from the outside into the cooking chamber 2. A camera 7 is arranged on a top wall 6 of a cooking chamber wall, said camera thus being directed from above into the cooking chamber 2. A light source in the form of an LED 8 radiating white useful light NL into the cooking chamber 2 is also arranged on the top wall 6. The camera 7 and the LED 8 are connected to a control device 9 which is also connected to a touch-sensitive screen 10 which is able to be used as a control panel and to a radio module 11 for the wireless data transmission. In the cooking chamber 2, a plurality of foods G1 to G3 which are located in the field of view of the camera 7 are located on a carrier for food to be cooked, in the form of a baking sheet B.

The control device 9 is designed to operate the LED 8 with the brightness modulated, for example with a rectangular signal at a frequency of at least 50 Hz. The LED 8 is switched on and off by means of the control device 9 at least 50 times a second. If the LED 8 is switched off, the cooking chamber 2 and thus the foods G1 to G3 are only illuminated by means of the ambient light UL, however when the LED 8 is switched on, the foods are illuminated by the useful light NL thereof and the ambient light UL together. The control device 9 may also control the image capturing by the camera 7, and namely in particular synchronously with the on-phases to and/or off-phases to of the LED 8. The control device 9 may also be designed for image processing.

Figure 2:
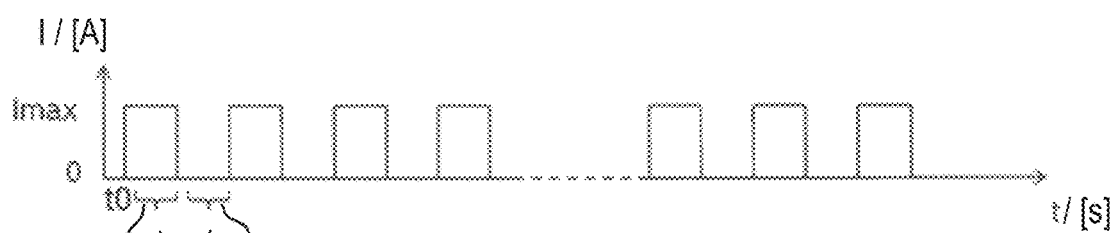
FIG. 2 shows a temporal progression of an operating current applied to the light source.

In particular, the control device 9 is designed to activate the camera 7 and the LED 8 such that initially at the start of a cooking process (where t=t0) a reference bright image is captured during an on-phase te of the LED 8 and, during an off-phase ta of the LED 8 subsequent thereto, a reference dark image is captured by means of the camera 9 as indicated in FIG. 2. To this end, during an off-phase ta the LED 8 is not supplied with current and during an on-phase te the LED is supplied with a maximum electrical current Imax (in Amperes).

In principle, the reference dark image may also be captured before the reference bright image. There is advantageously a short time period between the reference bright image and the reference dark image, so that the ambient light UL acting as stray light remains the same. Particularly advantageous is a capturing of the reference bright image and the reference dark image immediately one after the other. By subtracting the two images from one another pixel-by-pixel, a reference difference image (not illustrated) may be generated, for example by a corresponding image processing in the control device 9.

As a result, during an on-phase te of the LED 8 a (first) measurement bright image may be captured by means of the camera 7 and during an immediately preceding or following off-phase ta of the LED 8 a (second) measurement dark image may be captured. Then, for example, by means of the control device 9 the measurement dark image may be subtracted from the measurement bright image pixel-by-pixel or vice-versa in order to generate a measurement difference image. Advantageously, the reference difference image and the measurement difference image are generated in the same manner.

This may also be denoted as: difference image (t)=bright image (t)−dark image (t), optionally in absolute variables.

Figure 3:
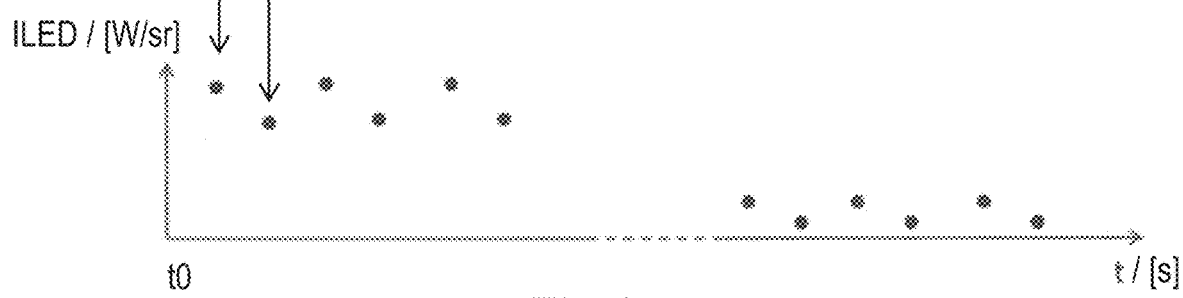
FIG. 3 shows a temporal progression of a radiation intensity measured for a specific pixel of the camera.

FIG. 3 shows a radiation intensity ILED measured by the camera 7 (in Watts per spatial angle sr) of any selected pixel which is assigned to a surface of a food G1 to G3 over time t (in s). The radiation intensity ILED represents a measurement of the brightness of the pixel. The measured radiation intensity ILED is greater generally in a bright image than in a dark image since the ambient light UL illuminates the cooking chamber in addition to the useful light NL and thus the food G1 to G3 reflects more light in the direction of the camera 7. In the course of a cooking process, the intensity of the ambient light UL may alter so that a difference in the radiation intensity ILED of the pixel between the bright image and the dark image also alters, for example as shown here it reduces. Moreover, by the browning of the food G1 to G3, the value of the radiation intensity ILED of the pixel measured by the camera 7 may be reduced for the bright image and for the dark image.

Figure 4:
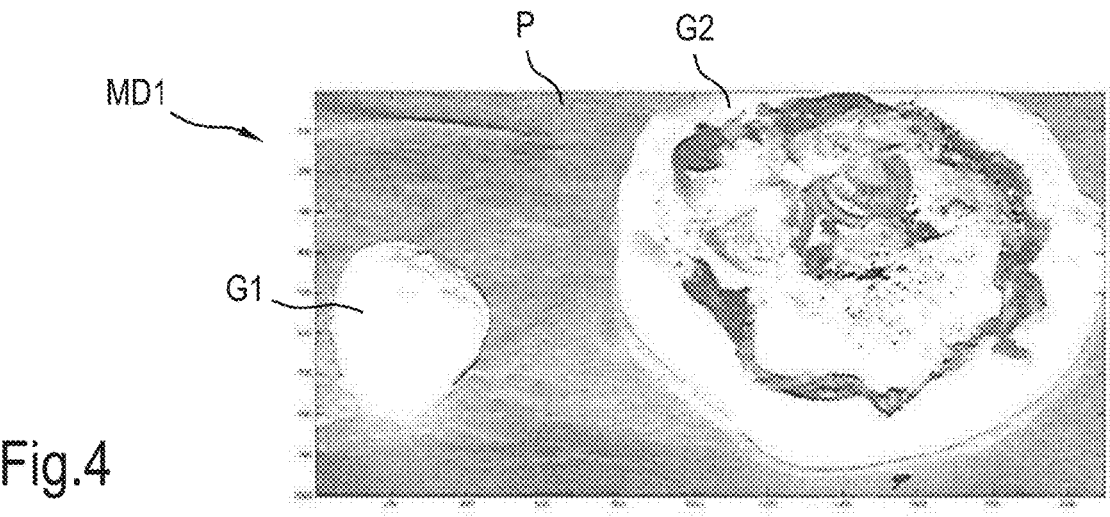
FIG. 4 shows a measurement difference image at a first time.
Figure 5:
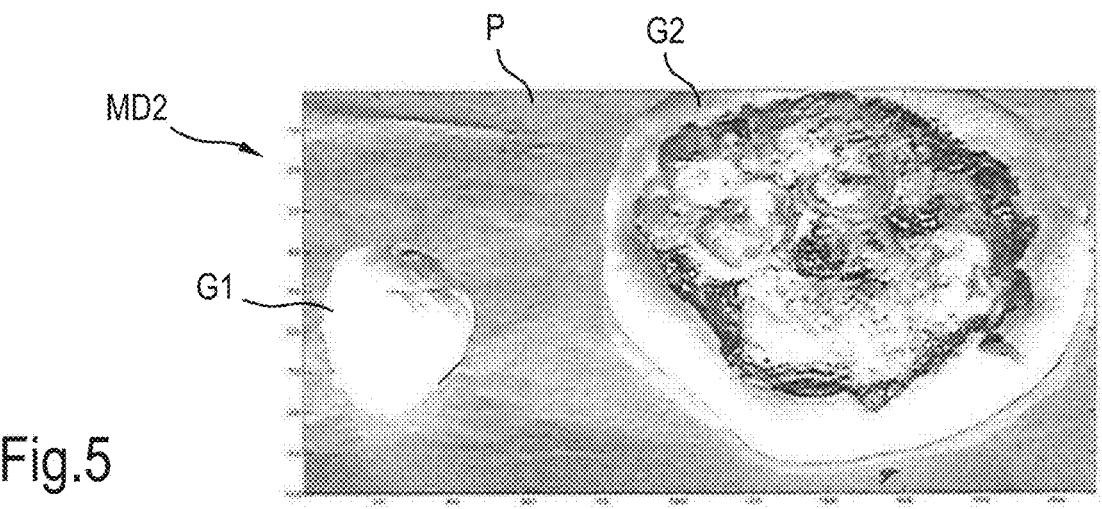
FIG. 5 shows a measurement difference image at a subsequent second time.

FIG. 4 shows as a gray-scale photograph a measurement difference image MD1 of two foods, namely of a piece of dough G1 and a garnished pizza G2, at a time t1>t0 of the cooking process. FIG. 5 shows as a gray-scale photograph a measurement difference image MD2 of the two foods G1 and G2 shown in FIG. 4, at a time t2>t1 of the cooking process progressed further. In both images, for example, the baking sheet B is covered with baking paper P which also appears as dark. Baking paper is typically brown. Thus without further measures the baking paper would be taken into consideration when determining the degree of browning, which could considerably falsify the determination.

Figure 6:
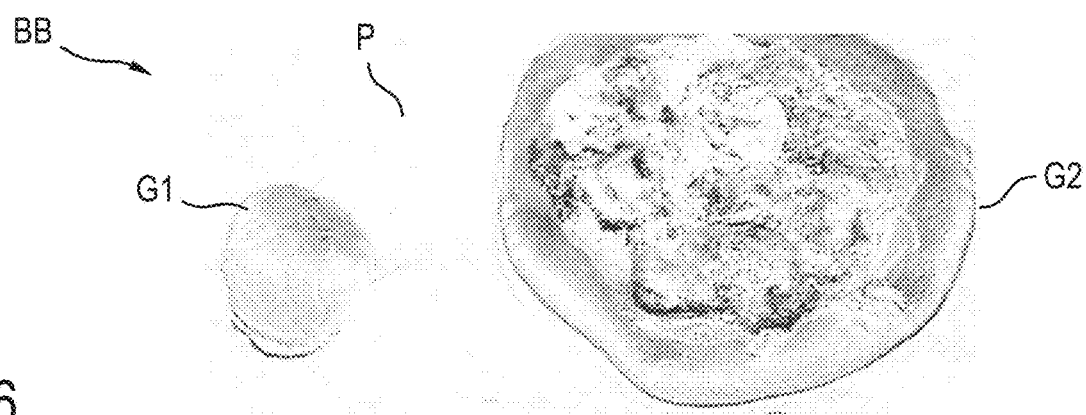
FIG. 6 shows a browning image.

For determining the degree of browning, in order to consider only pixels which show a browning progression, the measurement difference image MD1, MD2 is compared with the reference difference image and initially the reference difference image is subtracted from the measurement difference image Md1, MD2 or vice-versa. The resulting twice-differentiated image (hereinafter also denoted as the "browning image" BB) is shown in FIG. 6. The baking paper P has practically no more dark pixels, whilst the foods G1 and G2 are also clearly visible.

The browning image BB at a time t>t0 may also be expressed as: browning image (t)=measurement difference image (t)−reference difference image (t0), optionally in absolute variables.

Figure 7:
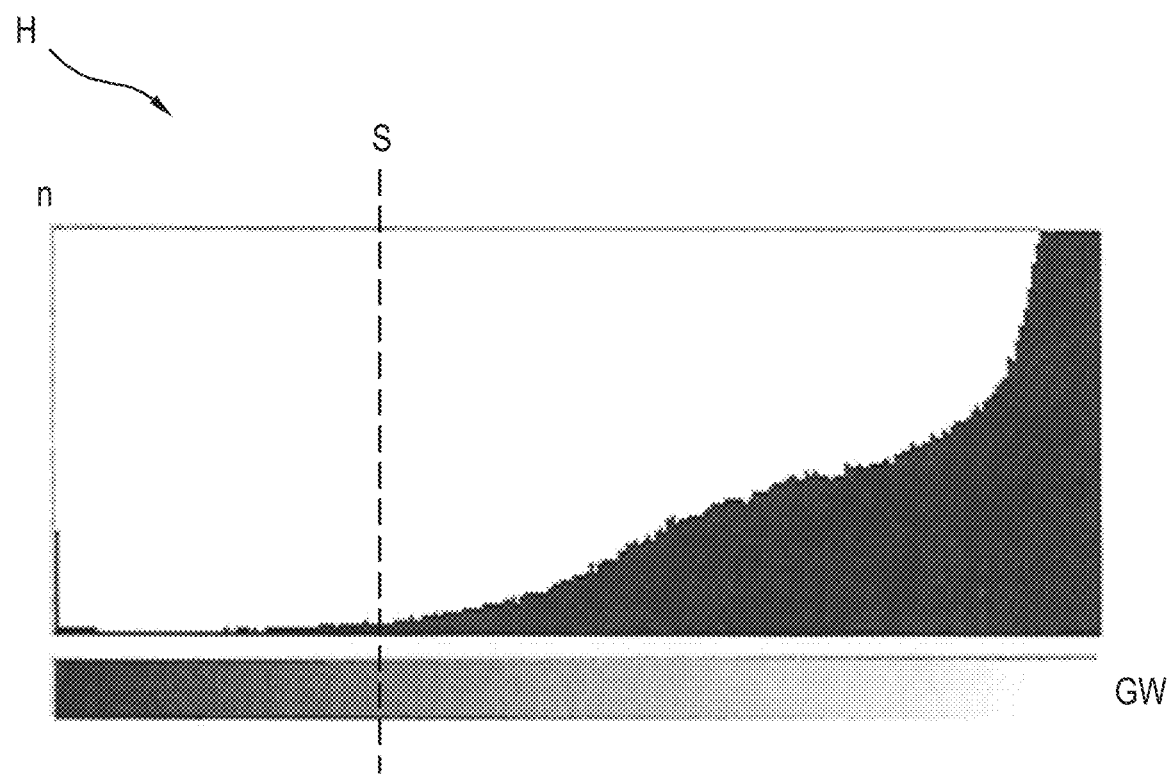
FIG. 7 shows a gray-scale histogram of the pixels of the browning image.

Hereinafter the pixels of the browning image assigned to a specific radiation intensity ILED or brightness are plotted on a histogram H as shown in FIG. 7. The histogram H in this case shows on the x-axis a gray-scale value GW assigned to the radiation intensity ILED and on the y-axis a number n of pixels assigned in each case to the gray-scale values GW. The gray-scales may extend from black (=value 0) to white (=value 255). In this case white pixels and optionally also virtually white pixels may be hidden or masked.

In order to determine whether a desired degree of browning has been reached, it is determined whether the contents of the histogram H fulfills a predetermined criterion, namely in this case whether a predetermined proportion and/or a predetermined number of pixels has reached a minimum coloration (expressed by exceeding a gray-scale value). This may be determined by this proportion of pixels reaching or exceeding a gray-scale threshold value S. The threshold value S may, for example, be altered by a user.

If this is the case, at least one action may be triggered by the control device. Thus—in addition to triggering a visual and/or acoustic signal—via the radio module 11 a message (for example including an image captured by the camera 7) may be emitted to a mobile phone or the like of the user. The user may remotely control the household cooking appliance 1 via the mobile phone, or the like, for example lengthen the cooking process, if after viewing the image the user is of the opinion that the browning is not yet sufficient. The household cooking appliance 1 may also automatically switch off the heating of the cooking chamber 1.

Naturally the present invention is not limited to the exemplary embodiments shown.

Thus the baking paper may have a predetermined pattern, the baking paper remaining masked and/or unconsidered by means of said pattern when creating the histogram. In addition, for determining the degree of browning, areas of the images to be considered may be predetermined by respective "bounding boxes". The bounding boxes may be predetermined by the control device 9 and/or by a user. The user may set these bounding boxes, for example, by means of the touch-sensitive screen 10 and/or via the radio module 11 by means of a mobile phone/smartphone/tablet, etc.

The household cooking appliance 1 may also have a wired interface to a network, for example an Ethernet connection.

Generally by "a", "an", etc. is understood a single number or a plurality thereof, in particular in the sense of "at least one" or "one or more" etc. provided this is not explicitly excluded, for example by the expression "just one", etc.

A number may also encompass exactly the specified number and also a conventional tolerance range as long as this is not explicitly excluded.

The invention claimed is:

1. A method for establishing a degree of browning of food in a cooking chamber of a household cooking appliance, comprising:

capturing a first reference image of a food item within the household cooking appliance at a first brightness of a light source of the household cooking appliance by a camera of the household cooking appliance, which camera is directed into the cooking chamber;

capturing a second reference image at a second brightness of the light source;

capturing a first measurement image of the food item at the first brightness;

capturing a second measurement image at the second brightness;

compensating for changes in ambient light by (a) generating a reference difference image using the first reference image and the second reference image, wherein a first set of pixels of the reference difference image correspond to the food item, and (b) generating a difference image using the first measurement image and the second measurement image, wherein a second set of pixels of the difference image correspond to the first set of pixels of the reference difference image; and determining the degree of browning of the food item by comparing the second set of pixels in the difference image with the first set of pixels in the reference difference image;

wherein comparing the first and second sets of pixels comprises determining whether a proportion of the second pixels having a minimum change in coloration has reached a selected threshold.

2. The method of claim 1, wherein comparing the difference image with the reference difference image includes generating a final image comprising a difference in color values between the reference difference image and the difference image.

3. The method of claim 1, wherein the first brightness is zero and the second brightness corresponds to a brightness when the light source is switched on.

4. The method of claim 1, further comprising operating the light source by pulse-width modulation at an eye inertia frequency.

5. The method of claim 4, wherein the first measurement image is captured during at least one off-phase of a pulse-width modulation and the second measurement image is captured during at least one on-phase of the pulse-width modulation.

6. The method of claim 1, wherein the light source has an LED.

7. The method of claim 1, wherein the difference image is compared in at least one area with the reference difference image.

8. The method of claim 1, wherein the difference image is compared with the reference difference image in an area with the proviso that the area has become darker as a cooking process progresses over time, or that the area is free of a predetermined pattern or that the area has been predetermined by a user.

9. The method of claim 1, further comprising triggering an action by the household cooking appliance based on the comparison of the difference image with the reference difference image.

10. The method of claim 1, further comprising compensating a reduction in a brightness of the light source due to ageing.

11. The method of claim 1, wherein comparing the difference image with the reference difference image includes generating a final image comprising a difference in gray-scale values between the reference difference image and the difference image.

12. The method of claim 1, wherein the difference image and the reference difference image are gray-scale images, and the minimum change in coloration includes minimum value of a difference of a brightness of a pixel of the second set of pixels in the difference image compared with a brightness of a corresponding pixel of the first set of pixels in the reference image.

13. The method of claim 1, wherein the difference image and the reference difference image are color images, and the minimum change in coloration includes a minimum value of an alteration of a color value toward brown or black.

14. A household cooking appliance, comprising:
a camera directed into a cooking chamber;
a light source configured to illuminate the cooking chamber; and
a control device coupled to the camera and the light source,
said household cooking appliance being configured to:
capture a first reference image of a food item within the cooking chamber at a first brightness of the light source by the camera,
capture a second reference image of the food item at a second brightness by the camera, and,
capture a first measurement image of the food item at the first brightness of the light source,
capture a second measurement image at the second brightness of the light source;
compensate for changes in ambient light by (a) generating a reference difference image using the first reference image and the second reference image, wherein a first set of pixels of the reference difference image correspond to the food item, and (b) generating a difference image from the first measurement image and the second measurement image, wherein a second set of pixels of the difference image correspond to the first set of pixels of the reference difference image;
compare the difference image with the reference difference image by comparing the second set of pixels in the difference image with the first set of pixels in the reference difference image; and
wherein comparing the first and second sets of pixels comprises determining whether a proportion of the second pixels having a minimum change in coloration has reached a selected threshold.

* * * * *